United States Patent [19]

Lamper et al.

[11] Patent Number: 5,053,772
[45] Date of Patent: Oct. 1, 1991

[54] RADAR SYSTEM EMPLOYING A METHOD FOR MOTION AND RANGE CLOSURE COMPENSATION

[75] Inventors: David Lamper, St. Charles; Thomas L. Grettenberg, St. Louis, both of Mo.

[73] Assignee: Electronics & Space Corporation, St. Louis, Mo.

[21] Appl. No.: 577,147

[22] Filed: Sep. 4, 1990

[51] Int. Cl.$^5$ .............................................. G01S 13/90
[52] U.S. Cl. ...................................... 342/25; 342/175
[58] Field of Search ........................... 342/25, 191, 175

[56] References Cited

U.S. PATENT DOCUMENTS

| | | | |
|---|---|---|---|
| 4,771,287 | 9/1988 | Mims | 342/25 |
| 4,924,229 | 5/1990 | Eichel et al. | 342/25 |
| 4,950,880 | 8/1990 | Hayner | 342/25 |

Primary Examiner—Mark Hellner
Attorney, Agent, or Firm—Polster, Polster and Lucchesi

[57] ABSTRACT

A method of providing motion compensation (i.e. phase, doppler frequency, and range closure correction) for wide band synthetic aperture radar (SAR) or classification/identification radar modes is disclosed. An improved radar system employing the method is also disclosed. The method involves dividing the motion compensation into both a focusing function and a range closure function. Either or both these functions is achieved by modifying the transmitted signal. For stretch waveform processing systems, the method involves generating both the transmitted and reference signals. The radar system includes a waveform generator capable of implementing the various motion compensation techinques when the transmitted waveform is a linear FM waveform.

8 Claims, 6 Drawing Sheets

RADAR SYSTEM EMPLOYING A METHOD FOR MOTION AND RANGE CLOSURE COMPENSATION

BACKGROUND OF THE INVENTION

This invention relates to radar systems, and more particularly, to an improved radar system utilizing a method for compensating a received radar signal for both the pulse-to-pulse change in signal delay, and the pulse-to-pulse change in phase and frequency which occurs when an object producing a reflected signal is moving relative to the radar platform.

As is known in the art, coherent radar systems operate to detect a target by using the amplitude, frequency, and phase of a signal reflected by the object. In synthetic aperture radar systems (SAR), the platform on which the radar system is based may move an appreciable distance between the transmission of one radar pulse and the transmission of the next radar pulse. In addition, if the platform is based on a moving object (aircraft, ship or land-based vehicle), movement of the platform due to turbulence, wave motion, vehicle swaying, etc. creates another factor which must be taken into account to obtain accurate radar information. Further, it is typical in such radar systems to combine successive pulse returns for signal processing so to form a coherent array of pulse returns. There is thus both a time delay, a doppler frequency shift, and a phase shift between the various returns which must be taken into account for proper signal processing. Therefore, at least two forms of signal compensation should be implemented in a coherent radar system to insure a high degree of system accuracy; range closure compensation, and platform motion or doppler phase and frequency compensation.

SUMMARY OF THE INVENTION

Among the several objects of the present invention may be noted the provision of an improved radar system for target identification and area mapping; the provision of such a radar system employing a method for applying a signal compensation to reflected signals received from an object; the provision of such a method to compensate for both movement of the object relative to the radar platform, and to motion of the platform due to turbulence, swaying, etc.; the provision of such an improved radar system employing a waveform generator; the provision of such an improved radar system in which the generator performs double integration of the phase second derivative to obtain the phase of the waveform to be transmitted; and, the provision of such an improved radar system in which double integration of the phase second derivative to obtain the waveform phase is performed in any one of a number of different sequences.

In accordance with the invention, generally stated, an improved radar system is for use in area mapping or target identification. A signal is transmitted from a movable platform, and a reflected signal from the ground or the target to be identified is received and processed. The system includes a coherent reference signal source and a generator for generating the waveform to be transmitted. A signal processor for processing the return signal to obtain information about the area being mapped or the target to be identified includes means for sampling the return signal. The waveform generator is responsive to receipt of a coherent reference signal and generates a modulated signal with means to control the starting phase, starting frequency, and time origin of the modulation. The generator produces a modulated sine wave having a particular set of signal characteristics including a bandwidth corresponding to that of the transmitted waveform. This provides an automatic compensation in processing of the return signal for both the difference between the leading edge of the sampled portion of the signal and the leading edge of the sampling window (i.e., range walk), and for any change in the received pulse-to-pulse phase and frequency due to motion of the platform occurring between the transmission of one pulse and the next (i.e. "focusing"). A method of radar operation is also disclosed. Other objects and features will be in part apparent and in part pointed out hereinafter.

BRIEF DESCRIPTION OF THE DRAWINGS

Corresponding reference characters indicate corresponding parts throughout the drawings.

DESCRIPTION OF A PREFERRED EMBODIMENT

Figure 1:
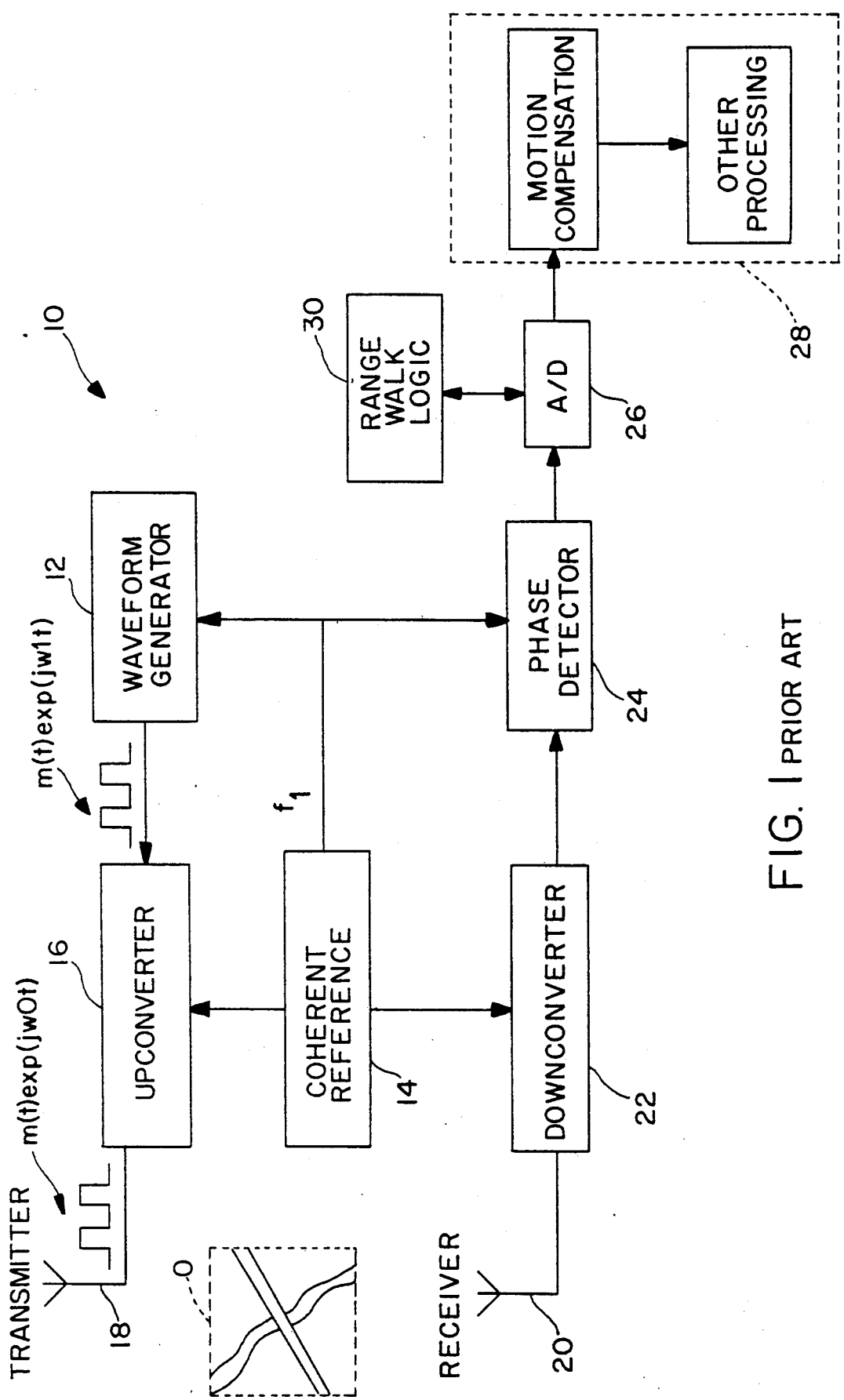
FIG. 1 is a block diagram of a coherent radar system.

Referring to the drawings, a prior art coherent radar transmitter and receiver system 10 is shown in block diagram form in FIG. 1.

A waveform generator 12 produces a complex, modulated pulse waveform m(t) on a coherent carrier frequency signal f1 which is supplied by a frequency generator 14. The waveform $m(t)\exp(jw_1 t)$ is supplied to an upconverter 16 for conversion to a coherent frequency signal f0. This is the frequency transmitted by the system's transmitter 18 and the transmitted signal is referred to as s(t). A signal reflected by an object 0 (for example, a point on a bridge within an area being mapped by the radar) is received by a receiver 20 of the system. This reflected signal is referred to as r(t). The received signal is supplied to a downconverter 22 and then to a phase detector 24. After phase detection, the signal is provided to an analog-to-digital (A/D) converter 26. As part of its operation, converter 26, which operates at a preset internal clock rate, performs a sampling operation on the pulses in the pulse train comprising the received signal. From converter 26, the received signal is supplied to a signal processor 28.

With respect to the system of FIG. 1, the transmitted signal may be mathematically represented as $$s(t) = m(t)\exp(jW_o t)$$

where $W_o = 2(\pi)f_o$. The signal received from object 0 is s(t-T) where T is a function of time if the object (or reflector) is moving relative to the radar system 10. Delay T is expandable into a Taylor's series which is evaluated at the leading edge of a received pulse. Thus, $$T = T_o + T'(t - T_o)$$

where T' is the derivative of T at $t=T_o$. The received signal r(t) at the input of converter 26 may be mathematically represented as $$r(t)=m(t-T_o)\exp(-jW_oT_o-jW_oT'(t-T_o)).$$

For SAR mode processing, or for target (object 0) identification, compensation is made to the received signal r(t). Compensation to the doppler phase and frequency components of the signal is called "focusing". Compensation in the signal equation for the changing delay $T_o$ relative to a converter sampling window center ($T_1$) is called "range walk" compensation and is performed in a range walk logic unit 30 which is connected to converter 26. For simplicity, the phase at the start of a received pulse is $$P_o=W_oT_o$$

and the doppler radian frequency is $$W_d=-W_oT'$$

This allows the received signal, at converter 26, to be expressed as $$r(t)=m(t-T_o)\exp(-jP_o+jW_d(t-T_o))$$

In low duty factor radar systems, i.e. where $W_dT_p<\pi$ ($T_p$ being the pulse width), the doppler frequency shift within the pulse can be neglected. For this situation, focusing calculations performed in signal processor 28 need only correct the starting phase of successive pulses in the received signal pulse train.

Figure 2:
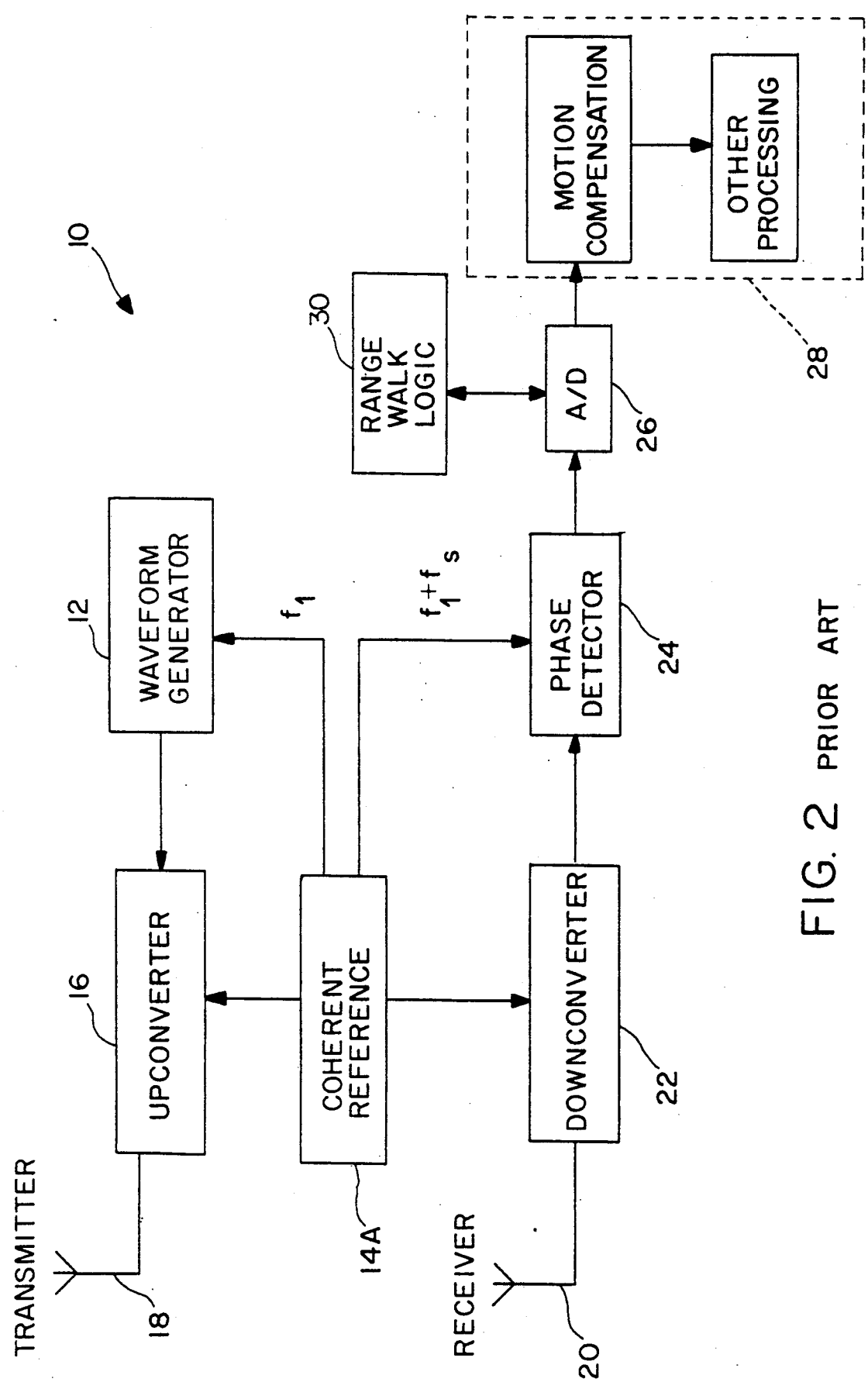
FIG. 2 is a block diagram of a coherent radar system with a reference offset.

Referring to FIG. 2, if the doppler frequency for the pulses in the received pulse train cannot be neglected, a coherent reference 14a within radar system 10 may add a frequency synthesizer offset $f_s$ to the reference signal supplied to the phase detector 24. Whereas in the system 10 of FIG. 1, the coherent reference frequency $f_1$ was supplied to both generator 12 and detector 24; now, the reference frequency supplied to the phase detector is $f_1+f_s$. The received signal supplied to converter 26 is now mathematically expressed as $$r(t)=m(t-T_o)\exp(-jP_2+j(w_d-w_s)(t-T_o))$$

where $$P_2=P_o+W_sT_o+P_1,$$

$P_1$ being the phase of the frequency synthesizer offset at $t=0$. This arrangement now allows the frequency synthesizer offset to be set for a nominal value of doppler frequency during the coherent array. This, in turn, means the frequency difference Wd-Ws can be neglected during the pulse. As a result, the signal at converter 26, regardless of whether or not the doppler frequency offset can be neglected, is $$r(t)=m(t-T_o)\exp(-jP)$$

and signal processor 28 compensates for the starting phase P on each output signal from converter 26 that is processed.

Figure 5:
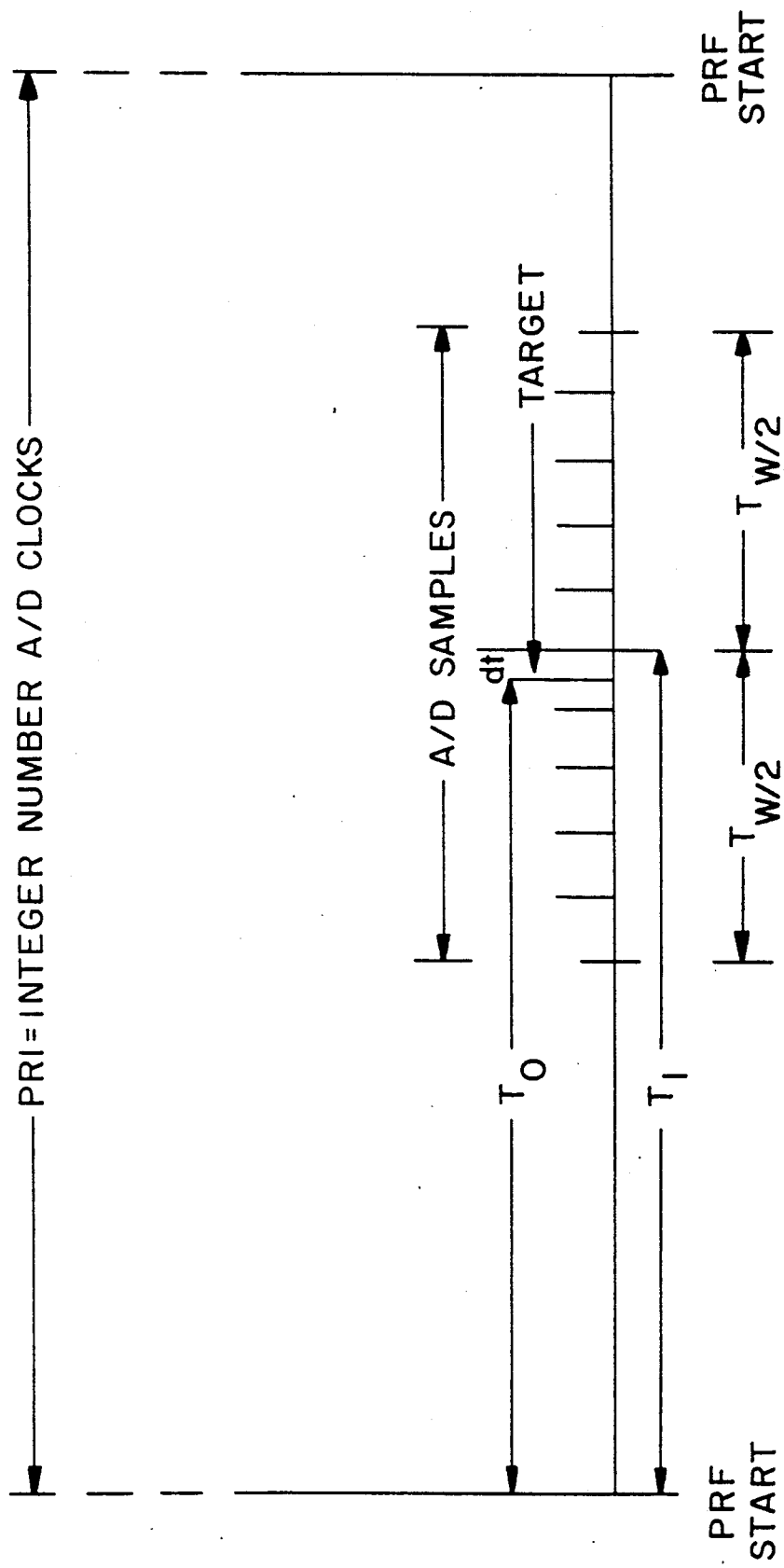
FIG. 5 is a timing diagram illustrating the "range walk" compensated for by the improved radar system.

As part of its analog-to-digital conversion operation, converter 26 samples, at set intervals, the signal supplied to it from detector 24. Range walk compensation is accomplished in logic unit 30 by performing an adjustment to this set of sampled values. The round trip delay of the pulse to the object 0 from the radar platform can be said to fall within the A/D delay sampling window the center of which is $T_1$, and the width of which is $T_w$ (see FIG. 5). The value $T_1$ is determined by rounding a computed value of $T_o$ to a least significant bit of $$dt=(1/n)(\text{converter 26's clock interval})$$

Where dt is the delay stabilization accuracy and n is a multiple of the converter 26 clock interval. After rounding, the signal at the output of converter 26 is $$r(T_1)=m(T_1-T_0)\exp(-jP)$$

In order to attain a delay stabilization accuracy of dt, range stabilization circuitry is required which runs at n times the converter 26 clock rate. In high resolution radar systems, this clock rate is so high, it may be difficult to implement stabilization circuitry which can run at such a high rate.

Whereas the pulse modulation m(t) has been the same on successive transmitted pulses in most radar systems, with the improved radars system of the present invention, this is no longer a requirement. Now, by generating waveforms using a method of direct digital synthesis, precise computations of both transmitted pulse phase and transmitted pulse frequency can be obtained for each successive pulse. Referring again to FIG. 1, the pulse modulation m(t) for each transmitted pulse is $$m(t)=a(t)\exp(jP_o-jW_dt)$$

where a(t) represents the modulation factor and is given by the equation $$a(t)=\exp(jP(t)),$$

with p(t) being any desired phase modulation function which could be the same for each pulse. Now, the received signal at the input to converter 26 is given by $$r(t)=a(t-T_o)$$

and focusing computations are no longer required to be performed in signal processor 28. Further, because doppler phase shift compensation has already been accomplished with each pulse, the frequency synthesizer feature of the coherent reference 14A shown in FIG. 2 is no longer required.

Not only does this technique solve the need for doppler phase shift compensation, but also the need for range walk compensation. $T_o$ is computed for each pulse transmitted. If $T_1$ is set equal to $T_o$ (rounded up to the nearest clock time of converter 26), then the difference between the two values is given as $dt=T_1-T_o$. The modulation factor a(t) is then computed as $$a(t)=\exp(jP(t-dt))$$

The output signal from converter 26 to signal processor 28 is $$r(T_1)=\exp(jP(T_1-dt-T_o)),$$

or $$r(T_1)=\exp(jP(0)).$$

It will be understood that while range stabilization accuracy using this method is theoretically perfect, errors involved in implementing a waveform generator capable of implementing the above steps will limit its performance. However, it is important to note that the clock required to generate $T_1$ does not have to operate faster than the converter 26 clock rate, even in high resolution radar systems, in order to accomplish range walk compensation.

The method of the improvement may also be implemented in a transmitter for use in stretch waveform systems. In transmitters for this application, a linear FM phase modulation is used. This has the form $$P(t) = A + Bt + Ct^2/2$$

where A, B, and C are constants. With both focus and range walk compensation on transmit, the signal x(t) received at receiver 20 is expressed as $$x(t) = \exp(jW_o t + jP(t - T_1))$$

Downconverter 22 now down converts this signal using the conversion factor $\exp(j(W_o - W_1)t)$ to provide an output $$= \exp(jW_1 t + jP(t - T_1))$$

Figure 3:
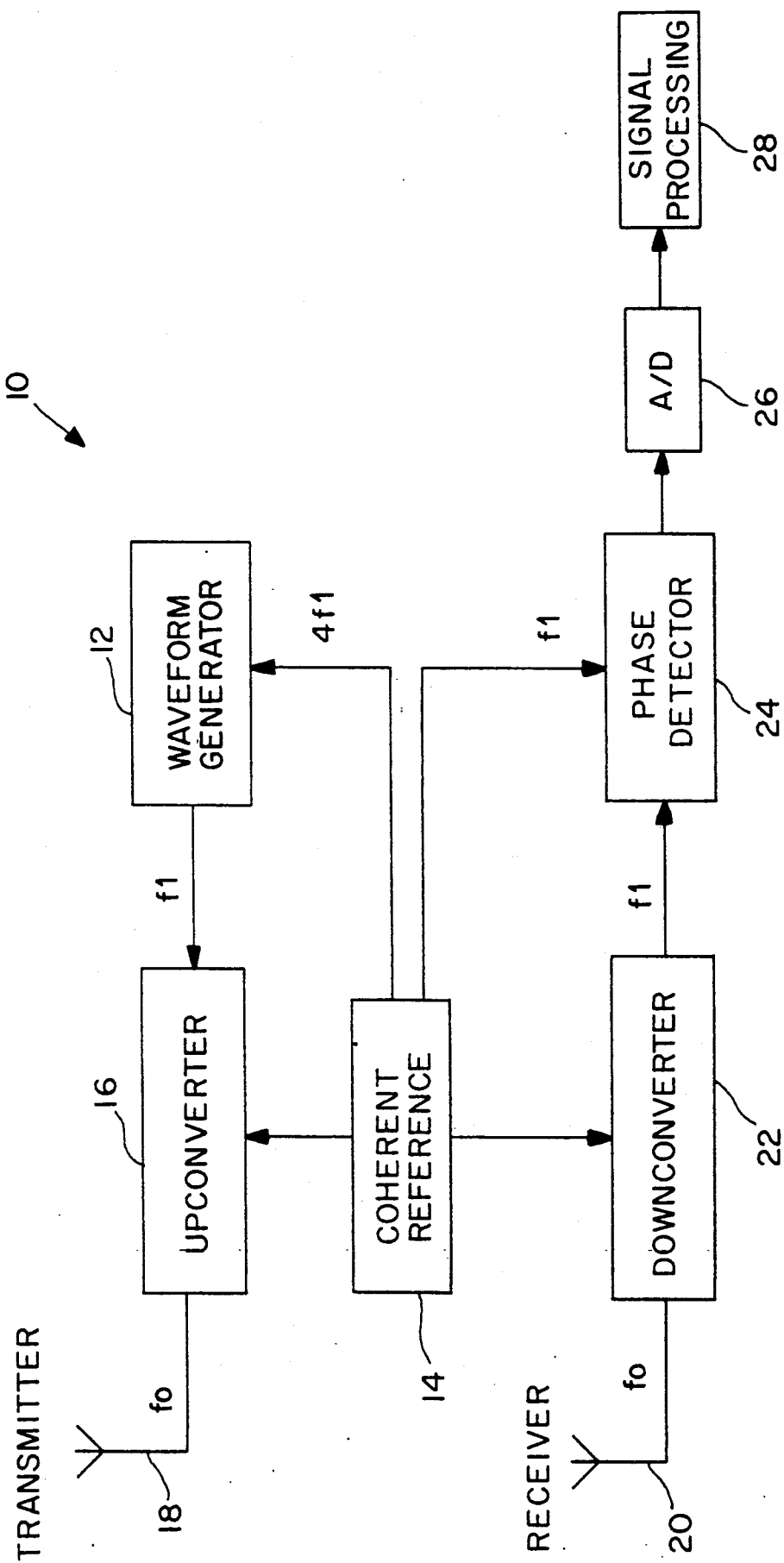
FIG. 3 is a block diagram of an improved coherent radar system of the present invention.

Referring to FIG. 3, an improved radar apparatus 10' of the present invention includes a waveform generator 12', which is the subject of a co-pending U.S. Pat. application Ser. No. 07/576,996. The generator is used to generate a linear FM reference waveform. This reference waveform is mixed with the received signal reflected from object O to produce the phase detector 24' output signal which is supplied to the input of A/D converter 26'. If, for example, generator 12' is started by counting down the clock in converter 26', the reference waveform and the converter will both be started at $T_2 = T_1 - (T_w/2)$, $T_w/2$ being a predetermined number of converter 26' clock pulses ahead of reference delay $T_1$. If $$T_2 < t < T_1 + T_p + T_2/2,$$

then the reference waveform y(t) can be expressed as $$y(t) = \exp(jW_1 t + jP(t - T_1))$$

and the output of converter 26, from the stabilization point, will be at dc. The output z(t) of converter 26', for a received signal having the same doppler phase shift and a delay of $T_o + dT$, will then be $$z(t) = \exp(jP(t - T_1 - dT) - jP(t - T_1)), \text{ or}$$
$$= \exp(-jBdT - jCdT(t - T_1) + jCdT^2/2)$$

This represents a sine wave varying in frequency from an upper frequency limit of $CT_w/2$ for $dT = -T_w/2$, to a lower frequency limit of $-CT_w/2$ for $dT = T_w/2$. Note that for any value of dT, e.g. $t = T_1$, the phase of the sine wave for any fixed sampling point in converter 26' is constant for each received pulse. This means the focusing and range closure compensations have corrected the return signals from all ranges at the same time. As a consequence, the improved radar system 10' of FIG. 3 can perform all the appropriate mapping functions of previous radar systems such as those of FIGS. 1 and 2 without the need for a range walk logic unit or motion compensation unit such as these systems require.

The waveform s(t) produced by generator 12', both for focus on transmit and range closure on transmit, is given as $$s(t) = \exp(jW_1 t)m(t), \text{ or}$$
$$= \exp(jP(t - dt) + jP_o + j(W_1 - W_d)t)$$

where P(t) is any phase modulation which is the same for each transmitted pulse.

Figure 4:
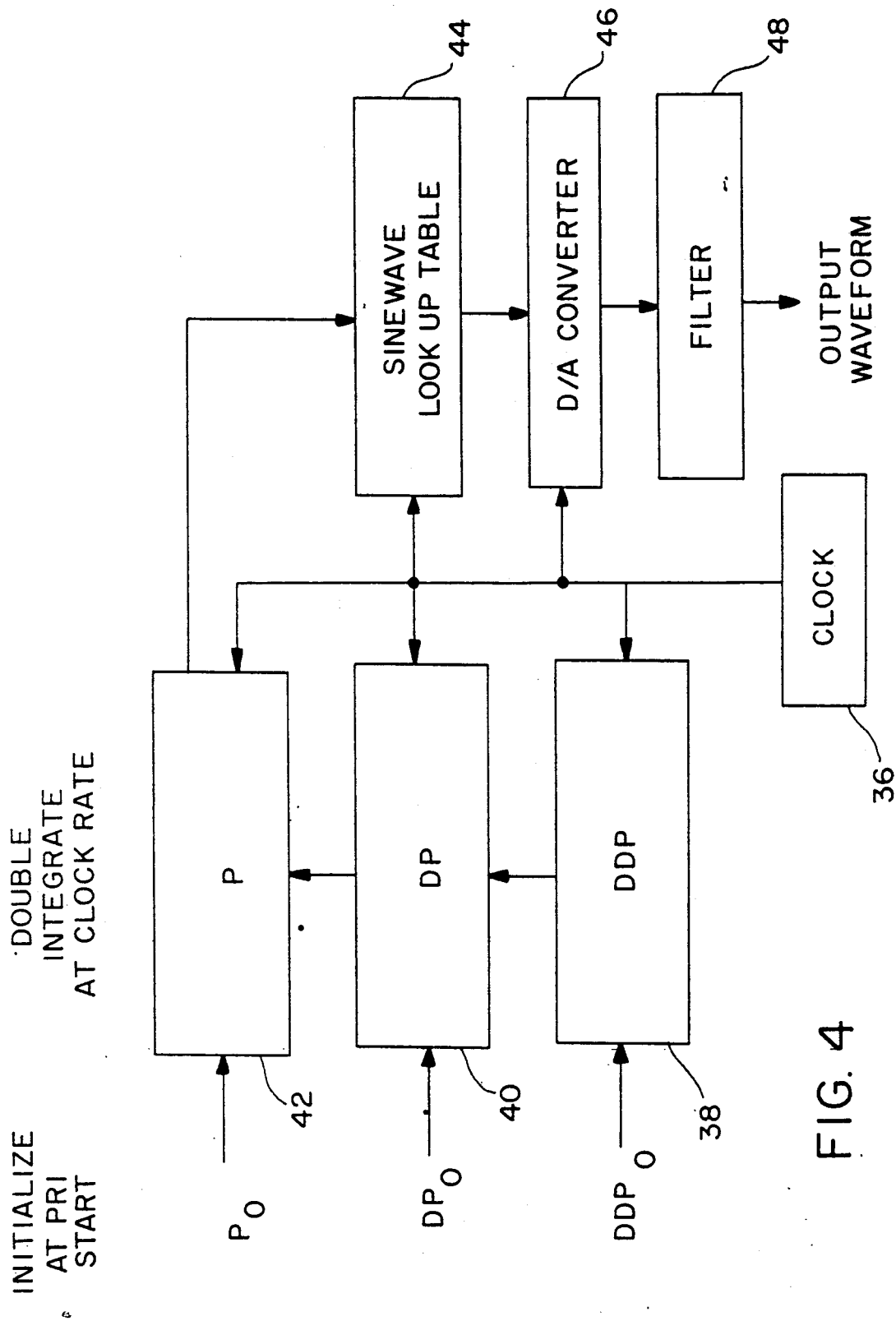
FIG. 4 is a block diagram for a waveform generator for an improved radar system of the present invention.

As noted above P(t) could be a linear FM signal of the form $$P(t) = A + Bt + Ct^2/2$$

and this desired waveform is generated using the waveform generator 12'. In the generator, an input clock 36 operates at a clock rate or frequency on the order of 4(f1). This clock rate is counted down to a submultiple of frequency f1 and this submultiple is supplied to converter 26' as its clock pulse. When the converter 26' clock is counted down to any fixed value, an array start is commenced. By operating in this manner to generate an array start means frequency f1 goes through an integral number of cycles each interpulse period. If the starting phase of frequency f1 is taken to be zero for each transmitted pulse, then $$s(t) = \exp(j(A + Cdt^2/2 + P_o - Bdt) +$$
$$j(W_1 - W_d - Cdt + B)t + jCt^2/2)$$
$$= \exp(j(D + Et + Ft^2/2))$$

where D, E, and F are the coefficients of the various powers of (t). The initial conditions for the generator 12' shown in FIG. 4, for each transmitted pulse, are $$DDP_o = F(T_c^2)$$

$$DP_o = E(T_c) + (DDP)/2, \text{ and}$$

$$P_o = D$$

where $T_c = 1/(4f1)$ and is the input clock period.

In operation, generator 12, functions as a double integrator prior to the starting pulse, the initial conditions $DDP_o$, $DP_o$, and $P_o$ are loaded into registers 38, 40, and 42. After the start pulse the following steps are performed once each input clock cycle.

transmitting the output P from integrator 42, which is the output of the integration section for the generator to a sine wave look-up table 44;

integrating, at integrator 42, the function P = P + DP to obtain P;

integrating, at integrator 40, the function DP = DP + DDP to obtain DP;

converting the digital value representing the sine wave to an analog value in a digital-to-analog converter 46; and, passing the resultant waveform through a low-pass filter 48 which is bandwidth matched with the output signal bandwidth.

It will be understood that the order of the first three operations above performed by generator 12, can be performed in 6, or 31, different sequences. That is, any of the three operations can be performed first, one of two remaining operations second, and the remaining operation last.

Regardless of the sequence of operations, at its completion, a double integration will have been performed. This is what is necessary for linear FM signal generation. It will be further understood that the initial conditions may vary for each of the six different sequences; however, those skilled in the digital logic arts will be able to readily determine what these conditions should be.

Figure 6:
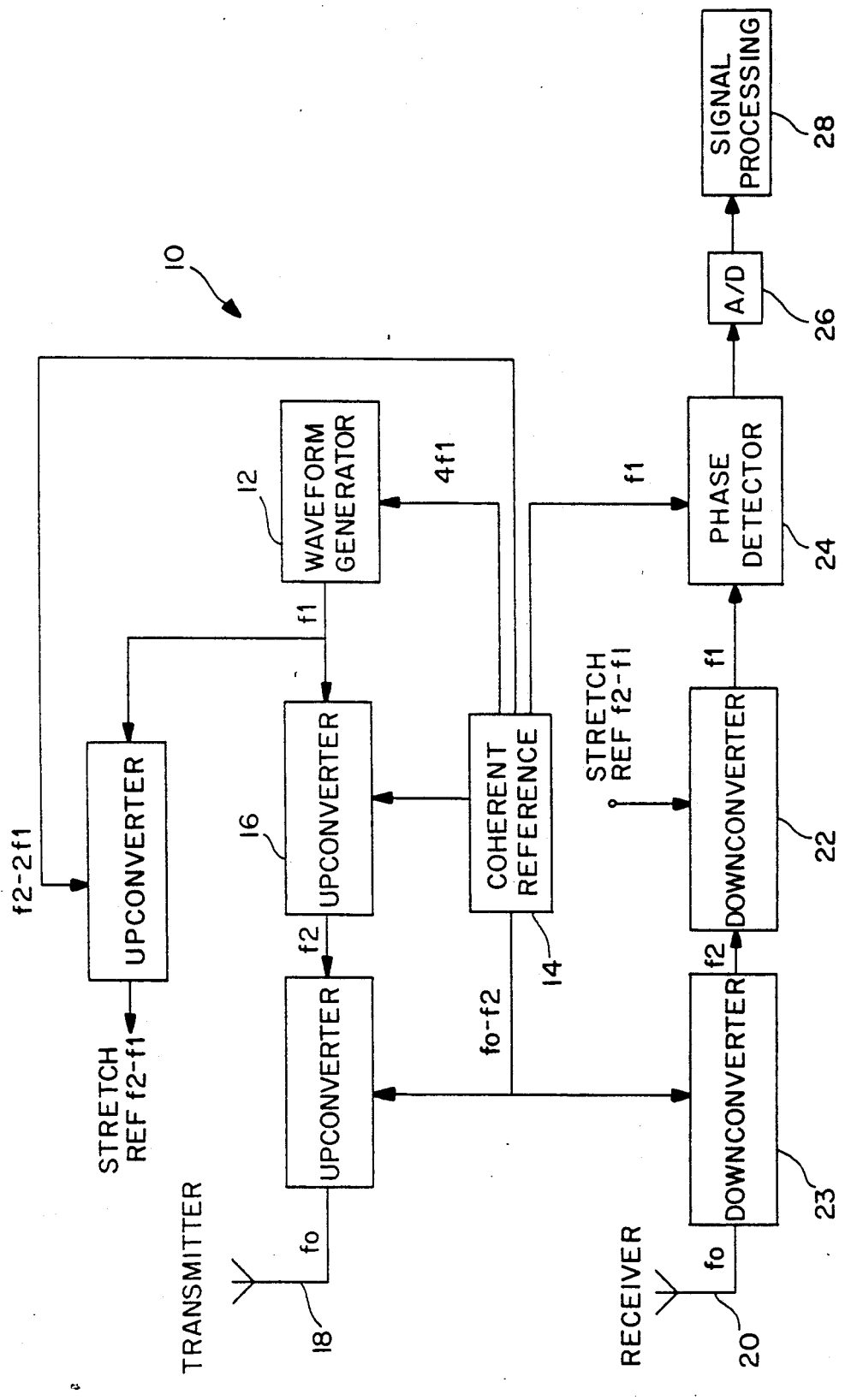
FIG. 6 is a block diagram for a second embodiment of the improved radar system.

As shown in FIG. 6 Generator 12" may also be used to generate the reference waveform used by receiver 20" in a stretch receiver mode. This reference waveform starts at $t=T_2$ and is expressed as $$y(t) = \exp(jW_1 t + jP(t-T_1))$$

If $s = t - T_2$, then for $0 < s < T_p + T_w$, the terms representing the respective phase angles may be collected as $$\begin{aligned} y(s) &= \exp(j(W_1 T_2 + A + C(T_w/2)^2/2 - BT_w/2) \\ & \quad j(W_1 - CT_w/2 + B)s + jCs^2/2) \\ &= \exp(j(D + Es + Fs^2/2)) \end{aligned}$$

The initial conditions for generator 12' are computed from D, E, and F using the same equations used for the transmitter waveform equations.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. An improved radar system for use in area mapping in which a signal is transmitted from a movable platform, and a reflected signal from the ground is received and processed, comprising:
   means for generating a coherent reference signal;
   means for generating a waveform to be transmitted;
   means for transmitting the waveform from the platform and for receiving a return signal reflected from the ground; and,
   means for processing the return signal to obtain information about the area being mapped including sampling the return signal, wherein the waveform generating means includes means to which the coherent reference signal is supplied, integrating means for performing a first integration and a second integration to obtain the coherent output signal phase to produce a resultant signal which automatically compensates, in processing of the return signal for both the difference between the leading edge of the sampled portion of the signal and the leading edge of the sampling window (i.e., range walk), and for any change in the received pulse-to-pulse phase and frequency due to motion of the platform occurring between the transmission of one pulse and the next (i.e. "focussing").

2. The improved radar system of claim 1 wherein the integration means includes means for performing a first integration and second integration of the phase second derivative to obtain the output signal phase and for combining the initial phase, the first integrated signal phase, and the second integrated signal phase in any combination thereof to produce a resultant signal.

3. The improved radar system of claim 2 wherein the processing means further includes a look-up table having as an input the resultant signal phase output of the combining means for producing a digital signal representing a sine wave having signal characteristics which are a function of the input.

4. The improved radar system of claim 3 wherein the processing means further includes a digital-to-analog converter for converting the digital signal to sine wave, and filter means for matching the bandwidth of the sine wave with that of the transmitted signal.

5. A method of identifying a target or mapping an area by a radar system comprising:
   supplying to a waveform generator a reference signal;
   performing a multiple integration of a phase second derivative to obtain an output signal phase;
   combining, in any combination, an initial phase and an integrated signal phase from each stage of the integration to produce a resultant signal;
   deriving from the resultant signal a waveform and transmitting the waveform; and,
   receiving and processing a return signal reflected by the target, the return signal being automatically compensated for both the difference between the leading edge of the sampled portion of the signal and the leading edge of a sampling window utilized in the signal processing, and for any change in the pulse-to-pulse phase and frequency of the the return signal due to motion of the platform occurring between the transmission of one portion of the transmitted waveform and the next.

6. The method of claim 5 wherein integrating the phase second derivative includes performing a first and second integration thereof.

7. The method of claim 5 for generating a linear Fm waveform.

8. An improved radar system for use in area mapping in which a signal is transmitted from a movable platform, and a reflected signal from the ground is received and processed, comprising:
   means for generating a coherent reference signal;
   means for generating a waveform to be transmitted;
   means for transmitting the waveform from the platform and for receiving a return signal reflected from the ground; and,
   means for processing the return signal to obtain information about the area being mapped including sampling the return signal, wherein the waveform generating means includes means to which the coherent reference signal is supplied, means for performing a multiple integration to obtain the coherent output signal phase to produce a resultant signal which automatically compensates, in processing of the return signal for both the difference between the leading edge of he sampled portion of the signal and the leading edge of the sampling window (i.e., range walk), and for any change in the received pulse-to-pulse phase and frequency due to motion of the platform occurring between the transmission of one pulse and the next (i.e. "focusing").

* * * * *

UNITED STATES PATENT AND TRADEMARK OFFICE
CERTIFICATE OF CORRECTION

PATENT NO. : 5,053,772
DATED : October 1, 1991
INVENTOR(S) : David Lamper et al

It is certified that error appears in the above—identified patent and that said Letters Patent is hereby corrected as shown below:

Col. 5, line 22 is "$= \exp(jW_1t+jP(t-T_1))$" should be --$r(t) = \exp(jW_1t+jP(t-T_1))$--;

Col. 5, line 43 is "$T_2 \angle +T_1 +T_p+T_2/2$" should be --$T_2 < t < T_1 + T_p + T_{w/2}$--

Col. 5, line 49 is "26,," should be --26',--;
Col. 6 line 50 is "12" should be --12'--;
Col. 8 line 41 is "Fm" should be --FM--; and Signed and Sealed this Twelfth Day of July, 1994

Attest:

BRUCE LEHMAN

Attesting Officer          Commissioner of Patents and Trademarks